Sept. 28, 1965   L. B. HEISER   3,209,326
PROTECTIVE ALARM SYSTEM FOR VEHICLES
Filed Sept. 7, 1961
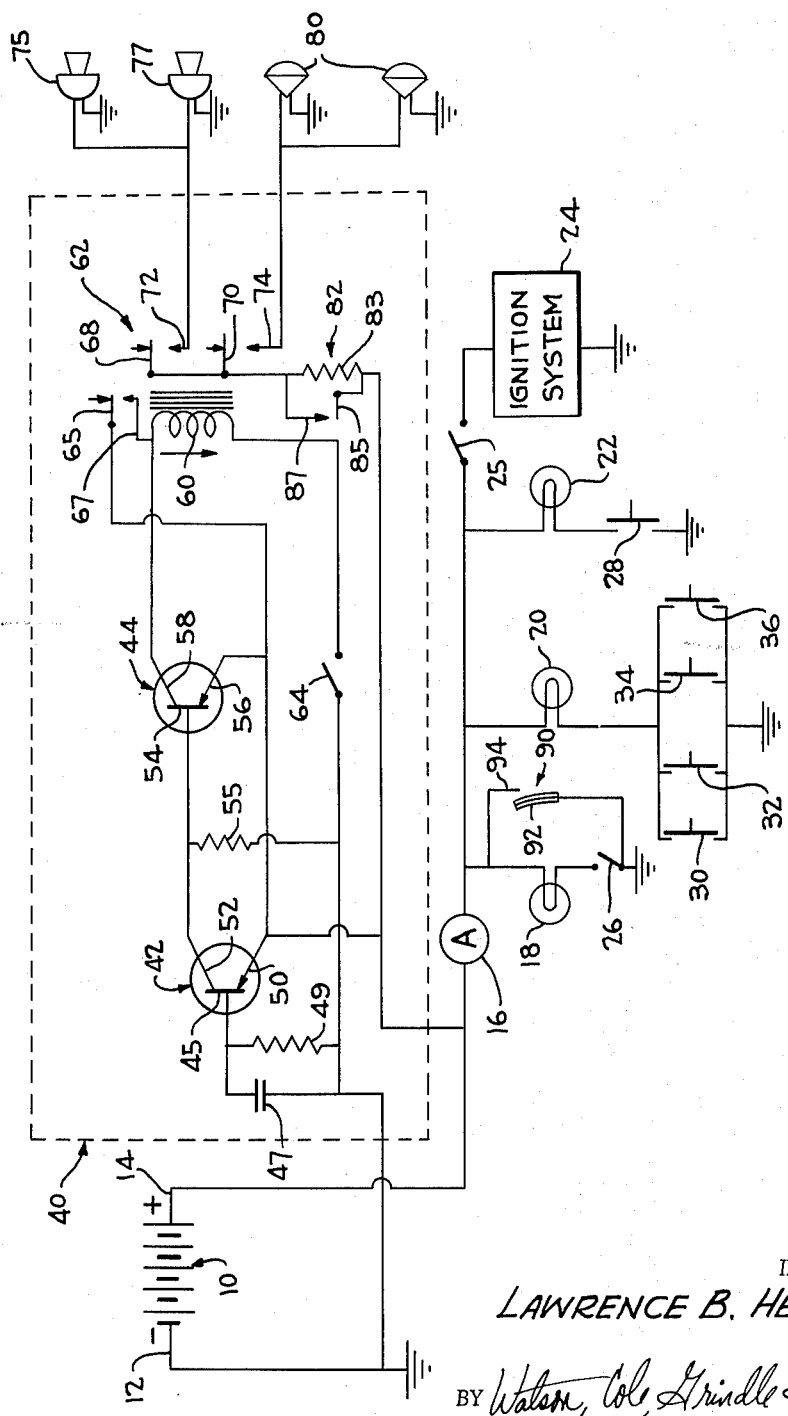
INVENTOR
*LAWRENCE B. HEISER*
BY *Watson, Cole, Grindle & Watson*
ATTORNEYS ns # United States Patent Office 3,209,326
Patented Sept. 28, 1965

3,209,326
PROTECTIVE ALARM SYSTEM FOR VEHICLES
Lawrence B. Heiser, 12 Wellington Road,
Winchester, Mass.
Filed Sept. 7, 1961, Ser. No. 136,567
2 Claims. (Cl. 340—63)

This invention relates to an electrical alarm system and, more particularly, to a combined burglar and fire alarm system particularly adapted for use on vehicles.

Priorly, numerous forms of electrical alarm systems have been employed on vehicles. These systems uniformly employ a current responsive relay connected in one or more electrical circuits, which circuits may be actuated by the closing of a switch, such as the type which is closed when a door is opened. The switch normally mounted in the facing of each of the doors for turning on the dome light of a passenger vehicle when the door is opened is a typical example of the type of switches employed to actuate these alarm systems. With such an arrangement, the current responsive relay must be capable of carrying a substantially heavy current. Further, the prior art alarm devices do not normally incorporate a fire protection system. Still further, the prior art systems are relatively expensive and require extensive labor in the installation thereof.

Accordingly, it is an object of this invention to provide an improved electrical alarm system.

It is another object of this invention to provide an improved electrical burglar alarm system.

It is a still further object of this invention to provide an improved electrical fire alarm system.

It is a further object of this invention to provide an improved electrical vehicle burglar alarm system.

It is another object of this invention to provide an improved electrical vehicle fire alarm system.

It is another object of this invention to provide a combination electrical burglar and fire alarm system for a vehicle.

It is another object of this invention to provide an electrical alarm system which is simple in construction and easy to install in a vehicle.

It is another object of this invention to provide a vehicle alarm system which can be placed in an operative condition while the occupant is in the car or while certain of the electrical alarm actuating circuits are closed.

Briefly, in accordance with aspects of this invention, an alarm system is provided which is particularly adapted for use on a vehicle, which system is connected across the battery terminals and senses any instantaneous decrease in potential across these terminals. Such a decrease in battery terminal potential occurs whenever an additional electrical circuit is completed. Advantageously, the alarm system will not respond to an increase in terminal potential such as when one of the electrical circuits currently in use is opened. Advantageously, the alarm system senses a decrease in potential of the battery and, in response to this decrease in potential, simultaneously energizes the horns and lights of the vehicle and intermittently continues to energize the horns and lights until the alarm system is turned off.

These and various other objects and features of this invention will be more clearly understood from a reading of the detailed description of the invention in conjunction with the drawing which is a combined block and schematic diagram of one illustrative embodiment of this invention.

As depicted in the drawing, the vehicle electrical system includes vehicle battery 10 having negative and positive terminals 12 and 14, respectively. In this particular instance, the negative terminal 12 is shown connected to ground such as the chassis of the vehicle, although it will be apparent that the positive terminal of the battery may be grounded instead. One terminal of ammeter 16 is connected to the positive terminal of the battery and the other ammeter terminal is connected to the vehicle lights, including one terminal each of a hood light 18, a dome light 20, and a trunk light 22. The ammeter is also connected to the conventional ignition system represented by block 24. The other terminals of the hood light and the trunk light may advantageously be connected to ground through mercury switches such as switches 26 and 28, respectively. The dome light 20 is connected in circuit with four parallel switches, 30, 32, 34, and 36. Each of these switches may be of the conventional type normally located in the doors of the vehicles to be closed or actuated when the associated door is opened. The mercury switches 26 and 28 will be closed when the hood or the trunk respectively, is opened.

When an attempt is made to start the vehicle by closing the ignition switch 25, current will flow from battery 10. In any of these examples of the completion of an electrical circuit, current flows through the battery and the potential between the battery terminals will instantaneously decrease because of the internal resistance of the battery. Advantageously, the alarm control system indicated by the block 40 is connected to the battery terminals 12 and 14 and acts as a voltage responsive device to detect the momentary decreases in the potential of the battery terminals. The alarm system includes a pair of transistors 42 and 44 connected in a pulse amplifying circuit with the transistor 44 connected to a relay for energizing the audible and visual alarm. The base 45 of transistor 42 is connected to the negative terminal of the battery through a parallel network including a coupling capacitor 47 and a biasing resistor 49. The emitter electrode 50 of transistor 42 is connected to the positive terminal 14 of the battery 10. Collector electrode 52 of transistor 42 is connected to the base electrode 54 of the transistor 44. A resistor 55 is connected between collector electrode 52 and negative terminal 12 of the battery 10. Emitter electrode 56 of transistor 44 is connected to emitter electrode 50 of transistor 42 and to positive terminal 14 of battery 10. Collector electrode 58 of the transistor 44 is connected to winding 60 of relay 62. The opposite terminal of winding 60 is connected through a key operated switch to negative terminal 12 of battery 10. Relay 62 includes an armature 65 and a contact 67 positioned to engage the armature 65 when coil 60 is energized. Contact 67 is connected to one side of winding 60. Armature 65 is connected to emitter electrodes 56 and 50 to define a holding path for the relay 62 when the winding 60 is energized by a pulse passing through transistors 42 and 44. Relay 62 also includes armatures 68 and 70 positioned to engage contacts 72 and 74, respectively. Contact 72 is connected to the normal vehicle horns 75 and 77. Contact 74 is connected to the vehicle lights, such as headlights 80. Also advantageously, armatures 68 and 70 are connected to the positive terminal 14 of battery 10 through a flasher unit 82. The flasher 82 includes a serially connected resistance heater element 83 and bi-metallic armature 85 operatively associated with a stationary contact 87. When the circuits through armatures 68 and 70 are completed to the horns and lights, current flows through the resistance 83 to cause the flasher 82 to operate. This intermittent actuation of flasher 82 causes the horns and lights to alternately emit energy and become de-energized, thereby acting as a combined audible and visual alarm.

In the operation of the alarm system a key is inserted at 64 and turned to complete the circuit from the collector 58 of transistor 44 through winding 60 of relay 62 to the negative terminal 12 of battery 10. Since the system 40 is enclosed in a box which is preferably installed as close to the battery as physically convenient, the hood must be opened to actuate the key switch 64, consequently hood light 18 is energized through the mercury switch 26. This, however, does not energize the alarm system since the hood light 18 is on before the key switch 64 is closed and the alarm system only responds to decreases in battery potential but is insensitive to increases in battery potential or to a steady state potential.

Similarly, if the car door is open when the key switch is closed, the dome light will be on but this will not actuate the alarm. The operator can now return to the inside of the car and close the door without actuating the system. Such a mode of operation permits the operator to sleep within the car while being protected by the alarm system which will be actuated when any of the doors are subsequently opened or when any of the subsequently described heat responsive switches are actuated.

When the hood is closed after key switch 64 is closed and one of the electrical circuits is subsequently energized, the potential between battery terminals 12 and 14 will exhibit an instantaneous decrease. This decrease causes a negative pulse to be transmitted through capacitor 47 to base electrode 45 of transistor 42. This negative pulse is amplified by transistor 42 and transmitted to the base electrode 54 of transistor 44 where it is further amplified. This amplified pulse is fed from collector electrode 58 through the relay winding 60. When winding 60 is energized by the amplified pulse, armatures 65, 68, and 70 are attracted to a position of engagement with contacts 67, 72, and 74, respectively. As mentioned previously, armature 65 and contact 67 complete the holding path for winding 60 and thus cause the alarm circuit to maintain an actuated condition until the key is inserted at 64 and the circuit disconnected. Horns 75 and 77 and lights 80 are energized through armatures 68 and 70, respectively, causing the flasher 82 to be energized. Flasher 82 periodically interrupts the energization of the horns and lights, thereby giving an intermittent visual and audible signal, which signal continues until key switch 64 is opened and the circuit of winding 60 disconnected.

If the alarm system is activated and a fire occurs under the hood, switch 90 will be closed, thereby energizing the alarm system in the same manner as if mercury switch 26 had been closed. Similar bi-metallic, or other heat responsive switches may be connected in parallel with each of the lights and located at strategic points on the vehicle.

Also the alarm system will indicate vehicle battery deterioration or a low voltage condition which may be caused by any one of a number of well known factors. For example, low voltage conditions occur from short circuits in the wiring system and within the battery or from lack of sufficient water in the battery electrolyte. This battery condition is indicated by operation of the alarm system each time the key switch 64 is closed, even before any additional electrical circuits are energized. Operation takes place because of the biasing arrangement of transistors 42 and 44. Under normal battery conditions, for example if the vehicle battery voltage is 12.2 volts, resistors 49 and 55 are of such values that transistor 42 is normally forward biased i.e. in conducting condition. In response to the conduction of transistor 42 a voltage is developed across resistor 55 which biases transistor 44 to cutoff. It is this cutoff bias which is overcome by the negative pulse fed to capacitor 47 when the system is normally actuated. When the pulse from capacitor 47 is applied to the base of transistor 42, the pulse renders transistor 42 non conducting, thus terminating the development of cutoff bias for transistor 44 across resistor 55. Transistor 44 then conducts and energizes winding 60 of relay 62. However, under a low voltage condition, previously described, transistor 42 cannot develop sufficient bias across resistor 55 to maintain transistor 44 normally cutoff. Accordingly, transistor 44 will conduct and energize the winding 60 each time key switch 64 is closed thereby indicating a low voltage battery condition. Similarly, the alarm system will be actuated if the alarm system is turned on and the low voltage condition subsequently occurs.

While I have shown and described one illustrative embodiment of this invention, it will be understood by those skilled in the art that other embodiments may be employed without departing from the spirit and scope of this invention.

What is claimed is:

1. In a vehicle having a vehicle storage battery with two terminals, a plurality of selectively operable load means causing current drain from said battery and therefore reducing voltage at the battery terminals when operated, said load means including lights operable as a car door is opened, the improved alarm system comprising in combination, voltage sensing means including a coupling capacitor, said voltage sensing means connected directly across the terminals of the battery with the capacitor connected to sense only instantaneous voltage drops therein caused by initial current pulses drawn when said load means is first operated, without electrically connecting said voltage sensing means to receive current passing through said load means, and alarm circuit means connected to the voltage sensing means operable upon occurrence of an instantaneous voltage drop in said battery.

2. For a vehicle with a storage battery and physically sensed means such as lights or horn therein, alarm operating means having two input terminals for connection directly across the terminals of the battery and an output terminal for connection to actuate said sensed means, the alarm operating means having a sensing circuit connected solely to the battery terminals by a capacitor to exclude current flow from other electric circuits in said vehicle connected to said battery and said sensing circuit including therewith unidirectional means of such polarity to respond only to instantaneous decreases in the battery potential caused by drawing a current from said battery as an electrical circuit in said vehicle is connected to said battery, and means coupled to the sensing circuit for energizing said output terminal responsive to said instantaneous decreases in battery potential.

References Cited by the Examiner

UNITED STATES PATENTS

| | | | |
|---|---|---|---|
| 1,774,457 | 8/30 | Singleton | 340—74 X |
| 2,338,811 | 1/44 | Hasbrook | 33—206 |
| 2,625,595 | 1/53 | Boddy | 340—201 |
| 2,910,689 | 10/59 | Grace | 340—384 |
| 2,994,073 | 7/61 | Pelovitz | 340—248 |
| 3,014,199 | 12/61 | Dill et al. | 340—34 |
| 3,038,110 | 6/62 | Paist | 340—249 |
| 3,074,049 | 1/63 | Saliba et al. | 340—65 |
| 3,103,003 | 9/63 | Roberts | 340—258 |

NEIL C. READ, *Primary Examiner.*

BENNETT G. MILLER, *Examiner.*